Oct. 27, 1959

G. W. YARBER 2,910,089

MULTIPLE-POSITION VALVE

Filed Sept. 4, 1958

GORDON W. YARBER,
INVENTOR

BY Barkelew + Lewis

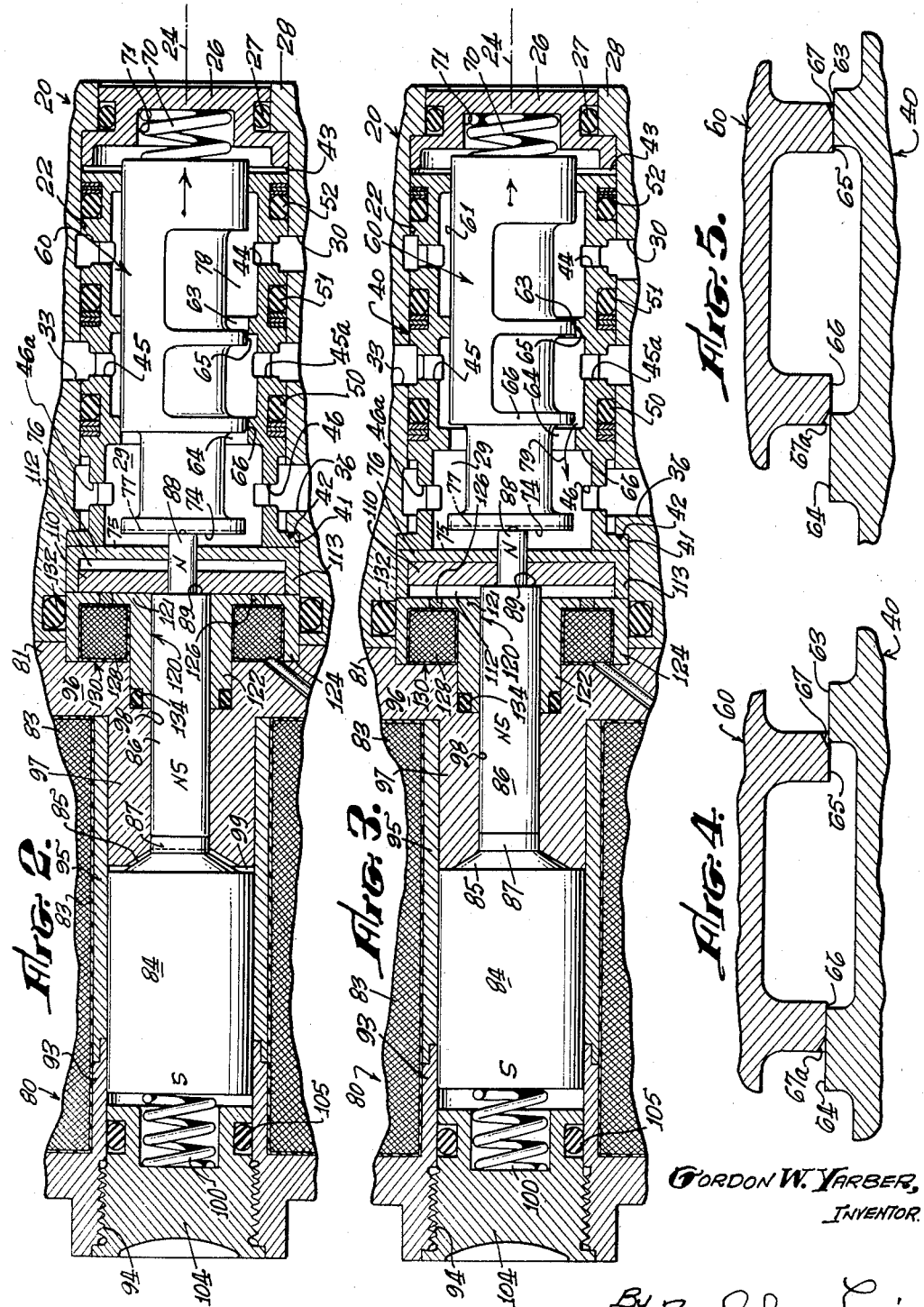

Oct. 27, 1959

G. W. YARBER 2,910,089

MULTIPLE-POSITION VALVE

Filed Sept. 4, 1958

Gordon W. Yarber,
INVENTOR.

By Barkelew & Lewis

Oct. 27, 1959   G. W. YARBER   2,910,089
MULTIPLE-POSITION VALVE
Filed Sept. 4, 1958   4 Sheets-Sheet 4
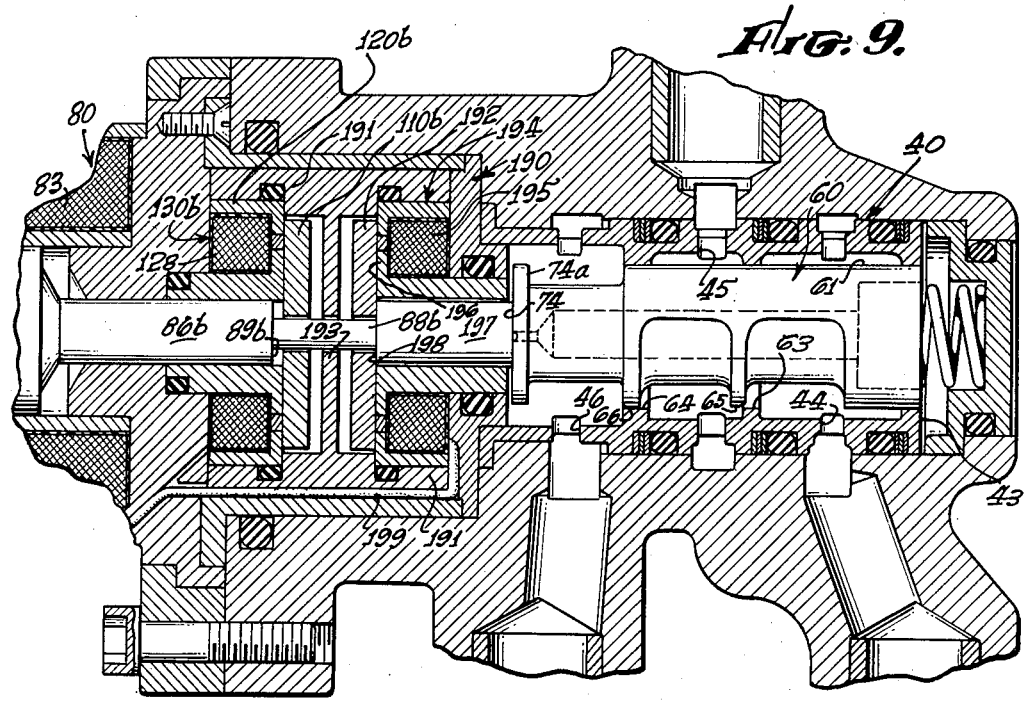
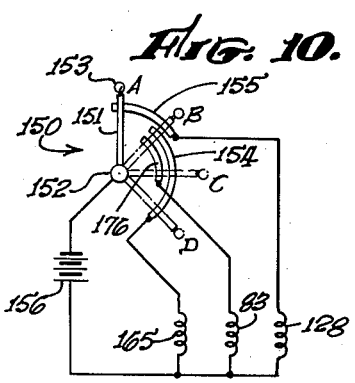
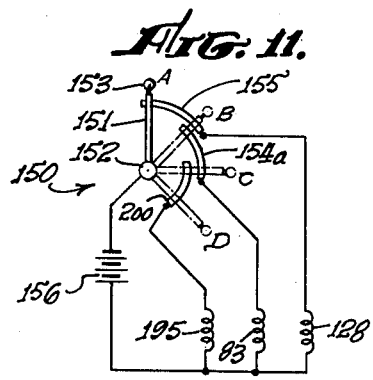
GORDON W. YARBER,
INVENTOR.
By Barkelew & Lewis

United States Patent Office 2,910,089
Patented Oct. 27, 1959

2,910,089

MULTIPLE-POSITION VALVE

Gordon W. Yarber, Cornell, Calif.

Application September 4, 1958, Serial No. 758,990

10 Claims. (Cl. 137—623)

This invention has to do with electrically operated valves, and, more particularly, with such valves in which a valve member is axially shiftable between three or more distinct positions.

Electrically operated three-position valves are known in which the valve member is shifted from normal position to an intermediate valve position by energization of one solenoid; and from intermediate to fully actuated valve position by energization of a second solenoid. However, such valves are subject to several disadvantages, some of which become especially serious when the valve is intended for aircraft service where weight is a primary factor.

In particular, previously available electrically operated three-position valves do not respond quickly and positively with respect to both steps of their operation unless both operating solenoids are relatively powerful. The cost and weight of copper and core structure required to provide effective actuation of one step has to be substantially doubled to provide equally effective actuation of both steps. Such disadvantages of previous structures are even more severe in multiple-position valves shiftable to more than three positions.

A primary object of the present invention is to permit effective actuation of a plurality of steps of valve movement with relatively little more weight than is needed to actuate a single step.

The invention thus provides a multiple-position valve of appreciably less weight than was previously possible without any reduction of operating speed and reliability. The invention also makes possible more rapid and reliable operation of such a valve without any increase of weight.

A further object of the invention is to provide an electrically actuated multiple-position axial valve structure shiftable between two extreme positions and capable of being selectively arrested at one intermediate position during its shift in one direction, and at another intermediate position during its shift in the other direction.

The invention further provides particularly desirable structural arrangements for carrying out its general purposes.

The novel valves of the invention are useful for a wide variety of valve operations, of which a particularly important example is the control of hydraulic brakes on aircraft landing wheels to obtain improved braking action and prevent skidding.

In accordance with the invention, a valve element is movable in one direction by solenoid means, which may be relatively powerful, and is selectively arrested during such movement at one or more predetermined intermediate valve positions by energization of holding solenoid means, which may be relatively light and require correspondingly little power. Valve movement in the other direction may be produced by corresponding structure, or by resilient means; in either case, the reverse movement may be arrested by energization of holding solenoid means at intermediate valve positions which may be either the same or different from the intermediate positions for the forward movement.

A full understanding of the invention and of its further objects and advantages will be had from the following description of an illustrative manner in which it may be carried out. However, the particulars of that description, and of the accompanying drawings which form a part of it, are not intended as a limitation upon the scope of the invention, which is defined in the appended claims.

In the drawings:

Fig. 2 is a fragmentary section corresponding to Fig. 1 and showing the valve in one intermediate position;

Fig. 3 is a fragmentary section corresponding to Fig. 1 and showing the valve in fully actuated position;

Fig. 4 is a detail at enlarged scale illustrating a modification;

Fig. 5 is a detail at enlarged scale, illustrating an alternative modification;

Fig. 9 is a fragmentary section corresponding to an intermediate portion of Fig. 1 and illustrating a further modification in an intermediate valve position;

Fig. 10 is a schematic diagram of illustrative electrical circuitry for controlling the valve; and Fig. 11 is a schematic diagram corresponding to Fig. 10 and illustrating a modification.

Figure 1:
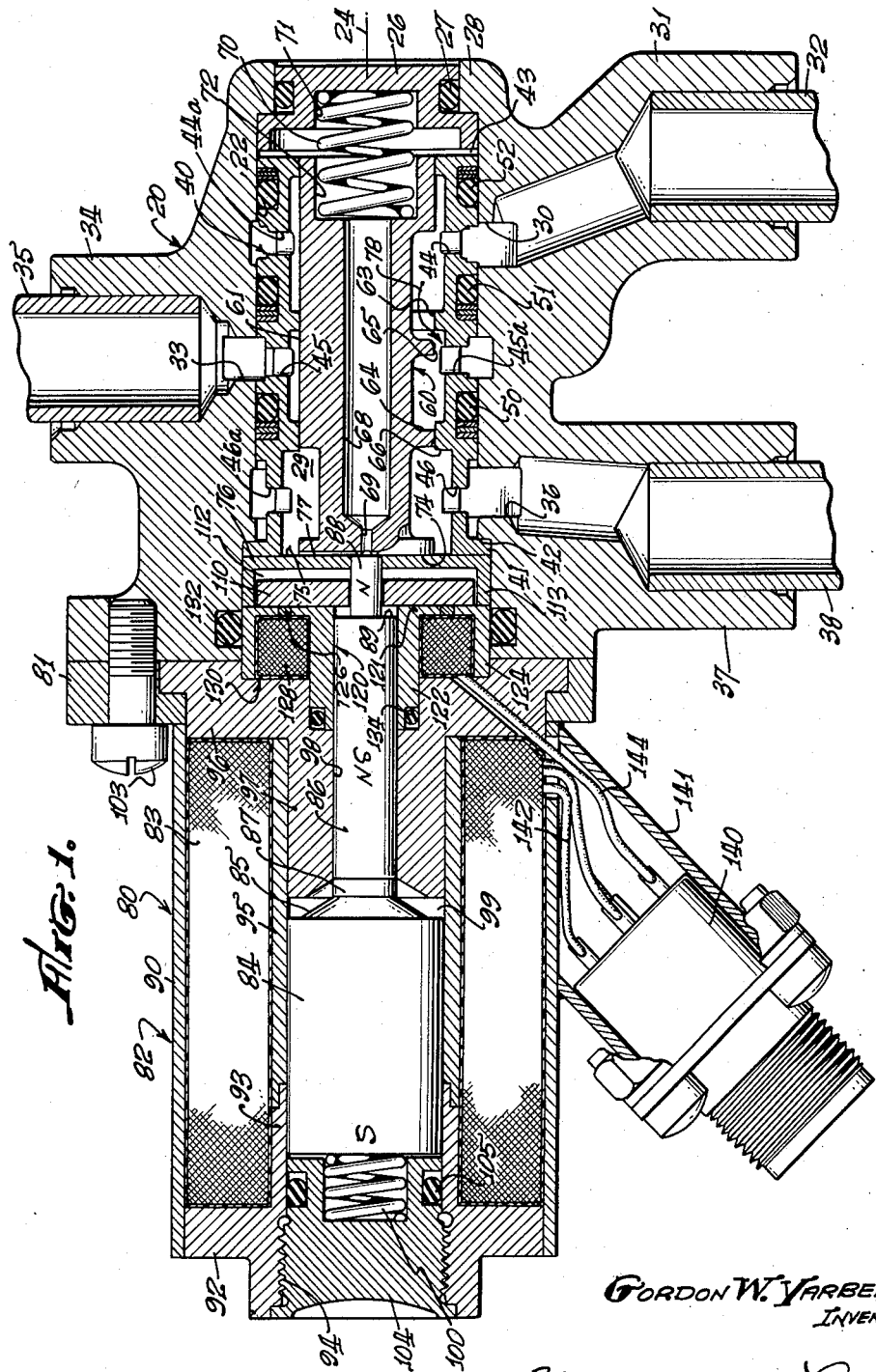
Fig. 1 is an axial section of an illustrative valve in accordance with the invention, shown in normal position.

An illustrative valve structure in accordance with the invention is represented in Figs. 1 to 3 and 10. A main housing member 20 is preferably formed as a casting of a non-magnetic material such as aluminum, for example. A cylindrical bore 22 in housing member 20 defines the main axis of the valve, indicated schematically at 24. One end of bore 22, which will be designated for convenience of reference as the inner end, is closed by the cap 26 and the sealing ring 27. Cap 26 is inserted through the outer end of the bore, and is retained by the housing flange 28. The outer end of bore 22 is closed by the solenoid structure to be described.

Transverse passages for fluid flow to and from the valve are provided in any convenient manner. The present valve has three radial passages 30, 33 and 36, provided with conventional fittings 31, 34 and 37, for connection of the fluid conduits 32, 35 and 38, respectively. For example, conduit 32 may supply hydraulic fluid under pressure from a suitable source such as a pump, that supply being either direct or via other valve control means; conduit 35 may lead to a device to be operated or controlled by hydraulic pressure, such as an aircraft wheel brake, for example; and conduit 38 may be a low pressure return line to the pump. The present illustrative type of valve may readily be designed to handle pressures of several thousand pounds per square inch.

A fitting sleeve or liner 40 of steel is fixedly received in housing bore 22, and forms the generally cylindrical wall of the valve chamber 29. The axial position of liner 40 is defined by engagement of the peripheral flange 41 at its outer end and the housing shoulder 42. The inner end of liner 40 is typically slightly spaced from cap 26 at 43. Liner 40 is provided with radial apertures 44, 45 and 46, axially aligned with fluid passages 30, 33 and 36, respectively. Additional circumferentially spaced apertures are typically provided at each of those axial positions, as represented at 44a, 45a and 46a, with fluid connections to the respective housing passages via suitably placed peripheral grooves in the outer face of the liner, in the inner face of the housing, or in both as illustratively shown. Fluid flow in an axial direction between liner 40 and housing bore 22 from one passage to another and from passage 30 around the inner end of the liner is prevented by suitable sealing means, shown as the O-rings 50, 51 and 52.

Fluid flow between the passages 30, 33 and 36 is controlled by means of the axially movable valve member 60. Valve member 60 has an outer cylindrical surface 61 which is received within liner 40 with an accurate sliding fit, permitting fluid flow between those members only where one or the other of the primary cylindrical surfaces is cut away. In the present valve two unbroken peripheral sealing surfaces 63 and 64 are provided on liner 40, spaced on opposite sides of central passage 33. Two continuous peripheral sealing surfaces 65 and 66 are similarly provided on valve member 60, spaced more closely than surfaces 63 and 64.

Three illustrative valve positions are shown in Figs. 1, 2 and 3. In the position of Fig. 1, which will be considered the normal position of the valve, surfaces 64 and 66 overlap, cutting off communication between passages 33 and 36; while surfaces 63 and 65 are axially spaced, permitting free fluid flow between passages 30 and 33, as indicated by the arrow 78. In that valve position a device connected to conduit 35 is thus subjected to fluid pressure in accordance with pressure supplied via conduit 32.

In the intermediate valve position of Fig. 2, surfaces 63 and 65 overlap and surfaces 64 and 66 also overlap, preventing free fluid flow between passage 33 and either of passages 30 and 36. All conduits leading to the valve are then typically shut off. The valve may be constructed, if desired, to permit limited fluid flow, when in this intermediate position, past either set of sealing surfaces, as by providing one or more axial grooves of predetermined size extending only part way across one of those surfaces. In Fig. 4 such a groove is shown illustratively at 67 in surface 65. With that construction the intermediate valve position typically permits fluid under pressure to leak at a controlled rate from pressure conduit 32 to brake conduit 35, causing a gradual increase of brake pressure. Fig. 5 illustrates at 67a an alternative leakage path such as may be provided past sealing surfaces 64 and 66, typically permitting braking pressure to bleed off gradually at a controlled rate to return conduit 38. Thus, the intermediate valve position of Fig. 2 typically maintains the pressure in conduit 35 substantially constant; but, with suitable detailed construction, may permit that pressure to rise slowly or to fall slowly.

In the valve position shown typically in Fig. 3, which will be considered the actuated position of the valve, surfaces 63 and 65 fully overlap, cutting off flow between passages 30 and 33; and surfaces 64 and 66 are axially spaced, permitting free fluid flow between passages 33 and 36, as indicated by the arrow 79. A leakage path such as groove 67 in Fig. 4 is typically, although not necessarily, completely closed off in the actuated valve position of Fig. 3.

The valve action in the three valve positions described is illustrative of the various types of valving action that may be provided in a multi-position valve. The invention is concerned more particularly with improved mechanism for producing controlled valve movement, and in its broader aspects is not limited to any particular arrangement of ports, nor to any particular valving action between those ports.

As illustrated, valve member 60 is yieldingly urged toward normal position (Fig. 1) by resilient means shown as the coil spring 70. Spring 70 acts directly between housing cap 26 and the inner end of valve member 60, and its ends are received in coaxial bores 71 and 72 in those respective members. The spring-urged movement of valve member 60 is outwardly limited by positive engagement of its outer end face 74 against a fixed abutment 75. That abutment in the present embodiment is the outer end wall of valve chamber 29. That wall is formed by the disk 76, the axial position of which is positively determined by direct engagement of its periphery and the outer end of liner 40. Wall 75 and outer end face 74 of valve member 60 thus comprise stop means which define the normal axial position of the valve.

An axial bore 68 in valve member 60 permits pressure equalizing fluid flow when the valve is moved. As shown, the outer end of bore 68 is restricted at 69 and communicates with valve chamber 29 through radial passages 77 formed by grooves cut in end face 74 of the valve member. Passages 69 and 77 may be designed, if desired, to permit only restricted fluid flow and thereby to damp the valve movement.

A primary valve-actuating solenoid assembly is indicated generally by the numeral 80, and comprises the main solenoid 82, which is of conventional annular form; the main armature 84, which is axially movable within the solenoid; and the push rod 86, which acts as a linkage mechanism to transmit armature movement to valve member 60. The entire solenoid assembly 80 is fixedly mounted on housing member 20, as by the screws 103 and the mounting ring 81 which may be an integral part of the solenoid core assembly.

Solenoid 82 comprises an annular winding 83 and a core structure of material having high magnetic permeability, such as soft iron, for example, which surrounds the winding except for a section where the magnet lines of force are transmitted through armature 84. That core structure includes a cover sleeve 90, an annular outer end piece 92 and a pole piece 96 which forms the inner end of the core structure and includes a pole 97 of substantially the same diameter as armature 84. The axial through bore 94 of end piece 92 facilitates disassembly of armature 84 and is closed by the screw plug 104. That plug is of non-magnetic material and is sealed by the O-ring 105. A sleeve portion 93 is integral with end piece 92 and extends a short distance into the winding. An inner sleeve 95 of non-magnetic material such as brass joins magnetic sleeve 93 and pole 97, forming a strong structural assembly and providing a continuous guideway for the free axial movement of armature 84 with space for liquid movement around it. The inner end face 85 of armature 84 adjacent pole 97 is formed to mate with the end of that pole and carries the central coaxial boss 87.

The main body of push rods 86 is of a uniform diameter which typically provides a free sliding fit with space for liquid movement around it in the axial bore 98 in pole piece 96. The inner end portion 88 of push rod 86 is of smaller diameter, forming an axially facing shoulder 89. The reduced portion 88 extends freely through an axial bore in disk 76 and directly engages the outer end face 74 of valve member 60. The outer end of push rod 86 is engaged by axial boss 87 on armature 84. Continuous engagement of those parts is maintained by the axial coil spring 100. That spring acts between the armature and the fixed end wall of the housing, which is formed by plug 104. Spring 100 is preferably strong enough to maintain contact of the parts under the maximum accelerations anticipated; but exerts less force than spring 70 at the inner end of the valve. Alternatively, push rod 86 may be directly connected to armature 84 or to valve member 60 or to both. In the latter instance, spring 100 may be omitted. In any case, since the armature, push rod and valve member ordinarily move as a unit, it is convenient for many purposes to consider them as a single movable element, which will be referred to as the movable valve assembly. In normal position of that valve assembly, the inner end face of armature 84 is spaced from the face of pole 97, forming an air gap 99, as shown clearly in Fig. 1; and the outer portion of the armature lies within magnetic sleeve 93.

In the mechanism as so far described, energization of main solenoid 82 produces in the core structure magnetic lines of force which pass from sleeve 93 into armature 84 and cross the air gap 99 into pole 97. Armature 84 is therefore strongly attracted toward the pole piece, causing valve member 60 to move rapidly inwardly against the force of spring 70 toward the actuated position shown in Fig. 3. Upon deenergization of the main solenoid, valve member 60 and armature 84 are returned by spring 70 to the normal position of Fig. 1. The time occupied by those valve movements may be determined within wide limits in known manner by suitable design relations between masses involved, the force produced by solenoid 82, and the force exerted by spring 70 less that of spring 100.

In accordance with the present invention, control mechanism is provided by which the valve movement from normal toward actuated position may be checked at a predetermined intermediate position. That control action is effectively positive, and positions the valve member accurately and reliably at the desired intermediate position. For that purpose the invention provides stop mechanism that is shiftable between an active and an idle condition under electrical control. When in active condition, that stop mechanism constitutes an effectively fixed abutment which limits the valve movement that can result from energization of main solenoid 82. That abutment is so placed as to produce accurately the desired intermediate valve position.

When the control stop mechanism is shifted to idle condition, that abutment is rendered ineffective to prevent further movement of the valve member. Under that condition, solenoid energization shifts the valve member to fully actuated position.

A further aspect of the present invention provides abutment structure of the described type which is especially simple and economical to construct and is convenient and reliable in operation. In preferred form of the invention, an abutment member is movable axially between acting and idle positions, the direction from its active to its idle position being the same as the direction of valve movement from normal to actuated position. The active position of the abutment member is defined by direct engagement with a fixed surface, against which it may be effectively locked by magnetic action of a control solenoid. Deenergization of the control solenoid releases the abutment member, and it is freely movable to idle position. Cooperating stop faces are provided on the abutment member and upon the movable valve assembly in such position that they are axially spaced in normal position of the valve; and that movement of the valve to intermediate position brings them into engagement if the abutment member is in active position, thereby stopping the valve movement.

In the present illustrative embodiment, the described abutment member is shown at 110. The movement of abutment member 110 between active and idle positions is controlled by a control solenoid, designated generally by the numeral 130 and including the winding 128 and core member 120. Member 110 is of high permeability material and acts as the armature of solenoid 130 in addition to its function as an abutment. Member 110 is of disk shape with an axial bore which fits freely over the reduced portion 88 of actuating rod 86. Member 110 is axially movable within a chamber 112 which is formed by the outer face of disk 76, the peripheral flange 113 of that disk and the inner wall 121 of the control solenoid core member 120. Core member 120 is of generally annular form with a central bore of the same diameter as bore 98 in pole piece 96 already described. An annular channel is formed in core member 120 between radially inner and outer flanges 122 and 124. Pole piece 96 of main solenoid 82 is counterbored to receive those two flanges, forming a fully enclosed annular chamber in which the winding 128 of control solenoid 130 is contained. Core wall 121 is divided magnetically into radially inner and outer portions by the ring 126 of non-magnetic material, which interrupts the magnetic circuit of the core, but is physically joined in hermetically sealed relation to form a unitary core member 120. The face of wall 121 which opposes abutment and armature member 110 is made to mate accurately with the latter member, the two opposed faces being smooth and flat in the present embodiment. Suitable sealing means such as the O-rings 132 and 134 are provided between the outer periphery of core member 120 and housing member 20 and between inner flange 122 and pole piece 96, respectively.

An electrical connector 140 of conventional type is mounted in a side tube 141 which is secured in hermetically sealed relation to cover sleeve 90. Electric current is supplied to solenoid windings 83 and 128 via connector 140 and suitable insulated leads, indicated at 142 and 144. Current for energizing the solenoids may be provided from any suitable source, and is typically controlled by suitable switch means for the respective windings which may be operated in any desired manner, manually or automatically.

The entire main solenoid core is preferably fabricated as a unitary structure which includes connector tube 141 and mounting ring 81. That structure when assembled to valve housing 20 acts as a retainer for control solenoid core member 120, flanged disk 76 and valve liner 40 within housing bore 22, all of those elements being axially located either directly or very nearly directly by the one housing shoulder 42. That structure facilitates high accuracy in construction and minimizes temperature effects upon the valve action. The entire assembly can be disassembled by removal of the three screws 103.

Fig. 10 represents an illustrative electrical system for controlling the valve movements, and is representative of any desired type of control mechanism. A switch 150 comprises a switch member 151 rotatable about a pivot 152 by any suitable means, manual or otherwise, represented illustratively by the handle 153. Contact segments are indicated at 154 and 155, in position to be engaged by switch arm 151 at certain positions of its rotary movement. A source of electric power, shown as the battery 156 has one terminal connected to switch arm 151. Actuating solenoid winding 83 and holding solenoid winding 128 are connected between switch segments 154 and 155, respectively, and the other terminal of battery 156. In normal position of control switch 150, shown in solid lines and indicated by the letter A, a circuit is completed via segment 155 through control solenoid winding 128, while the circuit through main solenoid winding 83 is open at segment 154.

With the switch structure illustrated, the switch position A, shown in solid lines, energizes only control solenoid winding 128; position B energizes both solenoid windings 83 and 128; and position C energizes only main solenoid winding 83. Switch position D and winding 165 may be neglected for purposes of the present description.

Energization of control solenoid winding 128, as by position A or B of switch 150, produces magnetic lines of force in the surrounding core structure. The gap in the magnetic circuit at ring 126 deflects those lines through armature member 110, drawing the latter firmly against wall 121. Once it is in contact with that wall, armature 110 completes the magnetic circuit. The armature is therefore effectively locked in that position, as shown in Figs. 1 and 2. Due to the efficient holding action of the described magnetic structure, armature and abutment member 110 can be substantially positively locked in that position with a holding current in winding 128 that represents only a moderate number of ampere-turns. Interruption of that holding current, as by shifting switch 150 to position C, frees armature 110 to move away from wall 121 into the space provided by chamber 112.

When step-wise operation of the valve is desired, current is preferably maintained in control solenoid winding 128, as by position A of the present illustrative switch structure, when the valve is in normal position (Fig. 1). Abutment member is thereby effectively locked in contact with wall 121. Energization of main solenoid winding 83, as by shifting switch 150 to position B, then causes armature 84 to move rapidly inward (to the right in Fig. 1), carrying with it push rod 86 and valve member 60, and comperssing spring 70. Push rod shoulder 89 is thereby caused to engage the outer face of abutment member 110. Since the latter member is firmly locked in position against core wall 121 by action of control solenoid 130, the inward valve movement is arrested in an effectively positive manner. The resulting position is shown illustratively in Fig. 2. Although the number of ampere-turns of control solenoid 130 is typically only a small fraction of that of main solenoid 82, the appreciable air gap 99 that remains in the main solenoid magnetic circuit in intermediate valve position prevents it from breaking the continuous magnetic circuit of the control solenoid. As an example, satisfactory operation is typically obtained with a main solenoid current of about 3 amps. in a winding having 800 turns, and with a control solenoid current of only about 350 milliamps. in a winding having 400 turns. With the particular core arrangement illustrated, the solenoid windings are so connected that their energizing curernts flow in the same direction, that is, both clockwise or both counterclockwise about axis 24.

The amount of valve movement permitted between the normal position of Fig. 1 and the intermediate position of Fig. 2 is equal to the spacing between push rod shoulder 89 and abutment member 110 in the normal valve position. And that spacing may be seen to depend only upon the difference between the two sharply defined and accurately controllable dimensions: the length of reduced portion 88 of the push rod, and the thickness of disk 76 including its peripheral flange 124.

The valve is maintained in intermediate position as long as both solenoids are energized. Release of the main solenoid, as by return of switch 150 to position A, permits spring 70 to return the valve to normal position. With the valve in intermediate position, release of control solenoid 130, as by shifting of switch 150 to position C, releases abutment member 110 from its active position against wall 121. Continuing energization of main solenoid 82 then drives armature 84 and valve member 60 inward beyond the intermediate position, abutment member 110 being carried along with that movement. That movement may be limited by any convenient type of positive stop, which may act upon any part of the described movable valve assembly and which defines the actuated valve position (Fig. 3). In the present embodiment that stop means comprises the opposed mating faces of main armature 84 and pole 97. Alternatively, by suitable dimensioning of the parts, the actuated valve position may be defined, for example, by engagement of the inner end of valve member 60 and plug 26; or by engagement of abutment member 110 and disk 76, which forms the outer wall of the valve chamber.

Figure 6:
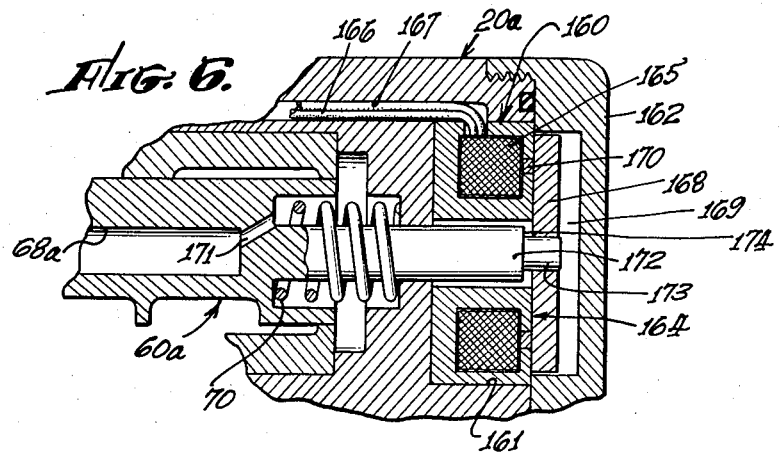
Fig. 6 is a fragmentary section corresponding to the right-hand end portion of Fig. 1 and illustrating a modification.

A particular advantage of the present invention is that it may be employed conveniently for producing a plurality of intermediate valve positions. For example, a second control solenoid and abutment member may be provided, which arrests valve movement at a second intermediate position after release of the first control solenoid. Such a second control may, like the one already described, be placed at any convenient point of the mechanism. Fig. 6 is a fragmentary axial section showing somewhat schematically how such a control mechanism may be placed at the inner end of the valve member in position to engage the valve member directly.

As shown in Fig. 6, housing 20a includes an inner end wall 161 of integral construction. A control solenoid 160, is mounted in a cavity formed between wall 161 and the housing cap member 162. Solenoid 160 comprises a winding 165 and core structure 164 which may be similar to that already described for solenoid 130. Electrical connections 166 for winding 165 may be provided in a suitable passage 167 formed in the housing body. An armature and abutment member 168 is axially movable in a chamber 169 formed between housing cap 162 and core structure 164. A ring of non-magnetic material 170 divides the axially inner core wall into magnetically separate portions, as already described in connection with ring 126 of control solenoid 130.

Valve member 60a of Fig. 6 carries a rod-like extension 172 which projects axially through a central bore in housing wall 161. An axial fluid connection is provided at 171 and 68a through the length of valve member 60a. The end portion of rod 172 is reduced in diameter at 173, forming a shoulder 174. End portion 173 is freely received in an axial bore in armature member 168. Shoulder 174 cooperates with member 168 to limit inward movement of valve member 60a under control of solenoid 160 in the manner already described for shoulder 89, armature 110 and solenoid 130 of Fig. 1.

Control solenoid structure such as 160 may replace structure 130 of Fig. 1; or may be provided in addition to such control structure, the parts being dimensioned so that the two control structures limit inward valve movement at two intermediate positions that are axially spaced. Successive release of the control solenoids will then permit step-wise valve movement to those positions and finally to fully operated position.

Such successive control may be obtained, for example, by connecting second control solenoid winding 165 as indicated in Fig. 10 between battery 156 and a switch contact segment 176, which engages switch arm 151 when the latter is in positions B and C, but not in normal position A and in the fully operated fourth position indicated at D. With that arrangement, as switch arm 151 is moved from A to B, the valve is moved from normal to first intermediate position as already described, and second control solenoid 160 is energized, placing armature 168 in operating condition locked against the core face. Movement of the switch arm to position C then releases the first control solenoid, permitting the valve to continue its movement in response to energized main solenoid 130, but only to the predetermined position at which shoulder 174 engages armature 168 of the second control structure of Fig. 6. Finally, movement of the switch arm to D releases the second control solenoid, permitting the main solenoid to move the valve to fully operated position.

A multiplicity of intermediate valve positions may be useful for many different types of control action. For example, a first intermediate position may be as indicated in Fig. 2, with provision for controlled leakage past surfaces 63 and 65 via a passage 67, as indicated in Fig. 4; and a second intermedaite position may be such as to seal that leakage passage, and to bring surfaces 64 and 66 into a position such as shown in Fig. 5, with controlled leakage via a passage 67a.

Figure 7:
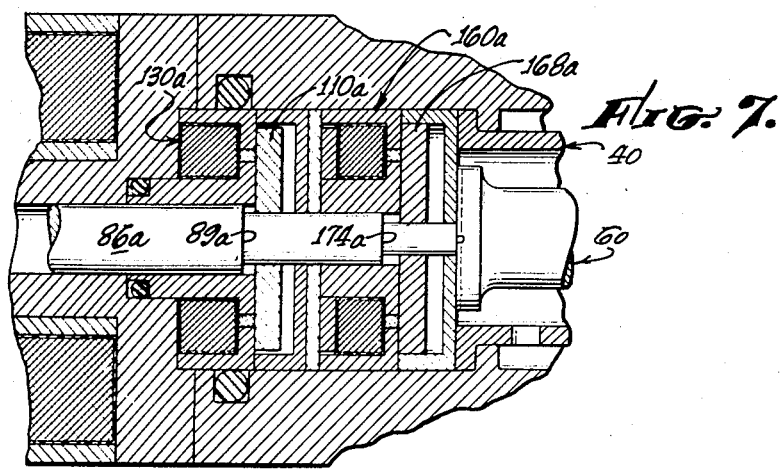
Fig. 7 is a fragmentary section corresponding to an intermediate portion of Fig. 1 and illustrating a further modification.

Two or more control solenoids may be arranged adjacent each other as shown illustratively in Fig. 7 at 130a and 160a. The two armatures 110a and 168a act as abutments for the respective shoulders 89a and 174a on push rod 86a, those shoulders being differently spaced from their abutments in normal position of the valve with both control solenoids energized, as shown.

Figure 8:
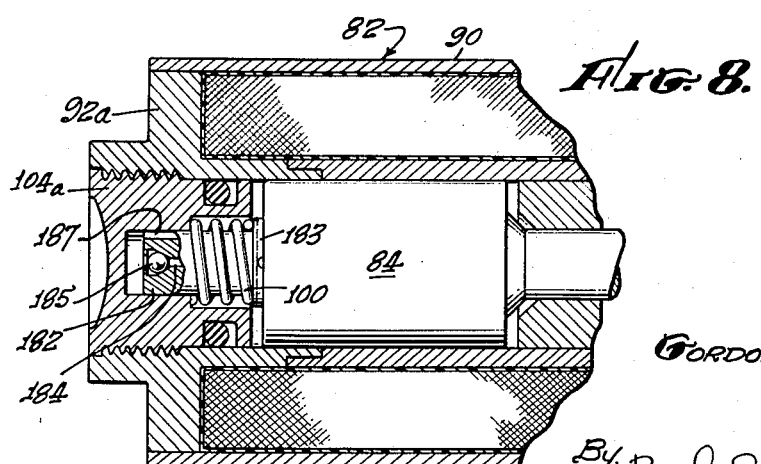
Fig. 8 is a fragmentary section corresponding to the left-hand portion of Fig. 1 and illustrating another modification.

Fig. 8 illustrated a modification which may be incorporated in any of the embodiments of the invention, and which provides controlled return movement of the valve to normal position after operation. Except for the features to be described, the embodiment of Fig. 8 is typically as already described (Fig. 1). Plug 104a, as shown in Fig. 8, is coaxially bored at 180 to fittingly receive the piston 182. The inner end of piston 182 abuts the outer end of armature 84, and is provided with an external flange 183 against which spring 100 presses. Piston 182 has an axial passage 184 with radial wings at its inner end and with a ball check valve 185 at its outer end, arranged to permit flow only outwardly through the passage. As the valve assembly moves to the right, as seen in Fig. 8, liquid can enter bore 180 through passage 184 and valve 185, and the described structure does not affect such valve movement. During return movement of the valve assembly, on the other hand, passage 184 is effectively cut off by valve 185, and the fluid trapped by piston 182 must escape before the valve assembly can return to normal position. The speed of the valve return movement may thus be determined by the fit of piston 182 in bore 180, for example. In the illustrated embodiment, that controlled action is limited to the latter portion of the return movement by the axial groove 187 in the cylindrical surface of piston 182. The limited length of that passage is such that it permits free fluid flow when the valve is to the right of the particular intermediate position illustrated in Fig. 8, but is cut off as the valve moves to the left of that position. Hence, in operation of the valve, it returns at normal speed from fully operated position to the intermediate position of Fig. 8, which may, for example correspond to the valve condition of Fig. 2; and then moves relatively slowly at a predetermined rate from that intermediate position to normal position.

The invention further provides means for positively controlling the return movement of the valve assembly toward normal position. Such control means are represented in illustrative form in Fig. 9. Main solenoid structure 80 and valve member 60 are typically essentially as already described in connection with Fig. 1. Two control solenoid mechanisms are provided, arranged in symmetrical opposing relation, and indicated generally by the numerals 130b and 190. Solenoid mechanisms 130b and 190 as illustratively shown, are arranged within a mounting sleeve 191 of non-magnetic material, which has an apertured wall 193 that separates the armature members 110b and 192 of the two structures. Mechanism 130b is typically substantially like mechanism 130 of Fig. 1 and mechanism 130a of Fig. 7, and its operation will be understood without further explanation. The winding 195 of second control mechanism 190 is surrounded by a core structure 194, which is similar to core 120b of first control mechanism 130b, except that it is axially reversed and is provided with an inner end wall 196 to complete its magnetic circuit.

The right-hand end of push rod 86b of the valve assembly directly engages valve member 60, as previously described. However, inward of the section 88b of reduced diameter it carries a section 197 of enlarged diameter, forming an outwardly facing axial shoulder 198. Armature members 110b and 192 are provided with axial bores which receive the reduced portion 88b of the push rod, between the opposing shoulders 89b and 198. Winding 195 is supplied with electric power via suitable leads indicated at 199.

Illustrative switch mechanism for controlling the valve mechanism of Fig. 9 is represented schematically in Fig. 11, and will be seen to correspond closely to that of Fig. 10. Second control solenoid winding 195 is connected between battery 156 and a switch segment 200, which engages switch arm 151 in positions C and D of the latter, while segment 154a of main solenoid coil 83 engages the arm only at position B and C. Operation of the valve at switch positions A, B and C is typically as has been described in connection with the previous embodiment, Figs. 1, 2, 3 and 10. Energization of winding 195 at position C locks armature 192 against core assembly 194, but that does not immediately affect the valve action. Movement of switch arm 151 from position C to D in Fig. 11 releases main solenoid winding 83, permitting the valve to be returned by spring action toward its normal position. However, second control solenoid winding 195 remains energized, holding armature 192 against core assembly 194. The return valve movement is therefore arrested by engagement of shoulder 198 with the armature in the position shown in Fig. 9. That valve position is maintained as long as the control switch remains at D. Rotation of the switch back to position C shifts the valve back to fully operated position, corresponding to the position of Fig. 3; and forward rotation of the switch from D to its normal position A releases second holding solenoid 190, permitting the valve to be spring-returned to its normal position, corresponding to the position of Fig. 1. That action also energizes first control solenoid 130b, in preparation for another cycle of controlled step action by the valve.

The detailed valve mechanism may be arranged to provide a wide variety of valving actions at the several step positions described. For example, if the spacing between shoulders 89b and 198 in Fig. 9 correspond to the distance between the working faces of the core assemblies of the two control mechanisms, the intermediate positions at which the valve is arrested during operating and return movements are the same. As a further example, with the spacing between shoulders 89b and 198 greater or less than the distance between the working core faces, the valve may be arranged to be arrested during operating movement at a position which permits leakage at a controlled rate between one pair of conduits, and to be arrested during its return movement at a position which permits leakage between another pair of conduits. As shown illustratively in Fig. 9, the spacing of shoulders 89b and 198 is greater than the distance between the working core faces of the two control solenoids. The intermediate control position during valve actuation is then typically as shown in Fig. 5, with a leakage path available if desired via 67a between passages 45 and 46; and the intermediate position during valve release, represented in Fig. 9, is typically as shown in Fig. 4, with a leakage path available if desired via 67 between passages 44 and 45. By constructing the valve with shoulders 89b and 198 spaced more closely than the working core faces, a position such as Fig. 4 may be obtained as intermediate position during valve actuation, and a position such as Fig. 5 may be obtained as intermediate position during valve release.

I claim:

1. An electrically operated multiple-position valve comprising a valve housing, valve means axially movable in the housing between normal and operated positions, means actuable to exert a yielding force upon the valve means to move it axially in one direction from one position toward the other, a control member movable between an active position and an idle position, abutment means engageable between the control member and the valve means in active position of the control member, said engagement arresting movement of the valve means at a predetermined position which is intermediate said normal and operated positions, and solenoid means for controlling movement of the control member between its said positions.

2. A valve as defined in claim 1, and in which the control member is movable to its active position in response to energization of the solenoid means.

3. An electrically operated three-position valve comprising a valve housing, valve means axially movable in the housing, biasing means yieldably urging the valve means axially in one direction toward a normal position, first solenoid means electrically energizable to move the valve means axially in the other direction against the force of the biasing means toward an actuated position, an axially movable control member, structure forming mutually opposed axially facing stop surfaces on the valve means and on the control member, respectively, second solenoid means energizable to hold the control member in a predetermined active position, said stop surfaces being then axially spaced when the valve means is in one of its said positions and being engageable by virtue of movement of the valve means to a predetermined position intermediate said normal and actuated positions.

4. An electrically operated multiple-position valve comprising a valve housing, valve means axially movable in the housing between normal and operated positions, means actuable to exert a yielding force upon the valve means to move it axially in one direction from one position toward the other, structure movable with the valve means and forming an annular shoulder facing axially in said direction, structure forming a fixed annular abutment facing axially in said direction, an armature, structure movable with the armature and forming a first surface adapted to engage said shoulder and a second surface adapted to engage said abutment, solenoid means energizable to hold the armature with said second surface engaging said abutment, the shoulder then being spaced from said first surface when the valve member is in said one position, movement of the valve means toward said other position being positively arrested at a predetermined intermediate valve position by engagement of the shoulder and said first surface.

5. An electrically operated multiple-position valve comprising in combination a valve housing, valve member axially movable in the housing, biasing means yieldably urging the valve member axially in one direction toward a normal position, actuating means actuable to move the valve member axially in the other direction against the force of the biasing means toward an actuated position, said actuating means comprising a first solenoid winding, a first armature movable axially in said other direction in response to solenoid energization, and coupling means between the armature and the valve member, structure movable with the valve member and forming an annular shoulder facing axially in said other direction, structure forming a fixed annular abutment facing axially in said other direction, a second armature, structure movable with the second armature and forming a first surface adapted to engage said shoulder and a second surface adapted to engage said abutment, a second solenoid winding energizable to hold the second armature with said second surface engaging the abutment, the shoulder being then spaced from said first surface when the valve member is in normal position, movement of the first armature in said other direction causing the shoulder to engage said first surface at a predetermined intermediate valve position.

6. A valve as defined in claim 5, and in which said first and second surfaces are formed directly on the second armature.

7. A valve as defined in claim 6, and in which said first and second surfaces are coplanar annular surfaces.

8. In a multiple-position valve which comprises a housing, valve means movable axially in the housing between predetermined limiting positions, and control means actuable to exert yielding forces upon the valve means to move it in respective directions between said positions, the combination of an axially extending formation movable with the valve means, an annular armature member surrounding said formation, coaxial solenoid means acting when energized to lock the armature member in a predetermined axial position and acting when released to permit movement of the armature member from that position in one axial direction, said formation having an annular shoulder facing axially in said direction and engageable with the locked member at a predetermined position of the valve means intermediate said limiting positions.

9. In an electrically operated multiple-position valve which comprises a valve housing including structure forming a valve chamber, a valve member movable axially with respect to the chamber between predetermined limiting positions, structure forming three passages communicating with the valve chamber, interengaging valve structure on the valve housing and the valve member arranged to provide substantially free communication between the first and second passages in one limiting valve position and between the second and third passages in the other limiting position of the valve; the improvement comprising first control means selectively actuable to arrest movement of the valve member in one direction between said limiting positions at one intermediate valve position, and second control means selectively actuable to arrest movement of the valve member in the other direction between said limiting positions at a second intermediate valve position which is spaced from the first intermediate valve position.

10. Improved valve means as defined in claim 9 and in which said interengaging valve structure provides only limited communication between the second passage and one of the other passages in said one intermediate valve position, and provides only limited communication between the second passage and the other of the remaining passages in said second intermediate valve position.

References Cited in the file of this patent
UNITED STATES PATENTS
2,586,906     Beckett et al. _____ Feb. 26, 1952